June 5, 1934.  R. F. KOHR  1,961,860
BRAKE
Filed Sept. 25, 1930   2 Sheets-Sheet 1

INVENTOR.
ROBERT F. KOHR
BY
M. W. McConkey
ATTORNEY

June 5, 1934.  R. F. KOHR  1,961,860
BRAKE
Filed Sept. 25, 1930   2 Sheets-Sheet 2

INVENTOR.
ROBERT F. KOHR
BY
M. W. McConkey
ATTORNEY

Patented June 5, 1934

1,961,860

UNITED STATES PATENT OFFICE

1,961,860

BRAKE

Robert F. Kohr, South Bend, Ind., assignor to Bendix Brake Company, South Bend, Ind., a corporation of Illinois Application September 25, 1930, Serial No. 484,262

9 Claims. (Cl. 188—79.5)

This invention relates to brakes, and is illustrated as embodied in an internal expanding automobile brake of the shiftable-anchorage type. An object of the invention is to simplify the construction of the brake, making it less expensive to manufacture, while retaining as many as possible of the desirable features and functions of the more expensive constructions. For example, the adjustment is simplified by forming sockets or the like for the adjusting device by folding over the ends of the friction band or its equivalent; a novel and inexpensive steady rest is provided by a simple stamping; and the applying means is simplified to a single floating lever arranged in a novel manner to fulcrum on one end of the friction means and thrust against the other end.

The above and other objects and features of the invention will be apparent from the following description of the illustrative embodiment shown in the accompanying drawings, in which.

Figure 5:
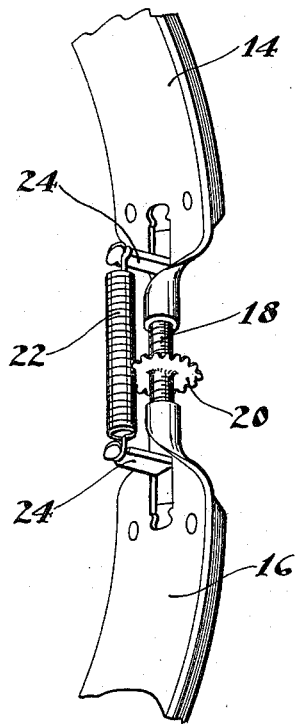
Figure 5 is an enlarged partial perspective of part of the friction means, showing the adjustment for wear.

The brake selected for illustration includes a rotatable drum 10, at the open side of which is a support such as a backing plate 12, and within which is arranged the friction means of the brake. The friction means of Figures 1 and 5 includes two bands or equivalent devices 14 and 16, faced with the usual brake lining, and connected by an improved adjusting device shown as a right-and-left threaded thrust member 18 received in alined threaded sockets formed by folding the sides of the bands 14 and 16 toward each other. The adjusting device 18 has an operating collar 20, notched at its periphery for engagement by a screw-driver or other tool by which it is turned, and is yieldingly held against unintended turning by a coil spring 22 tensioned between tongues 24 struck up from bands 14 and 16, the spring being seated in one of the notches of collar 20.

Figure 1:
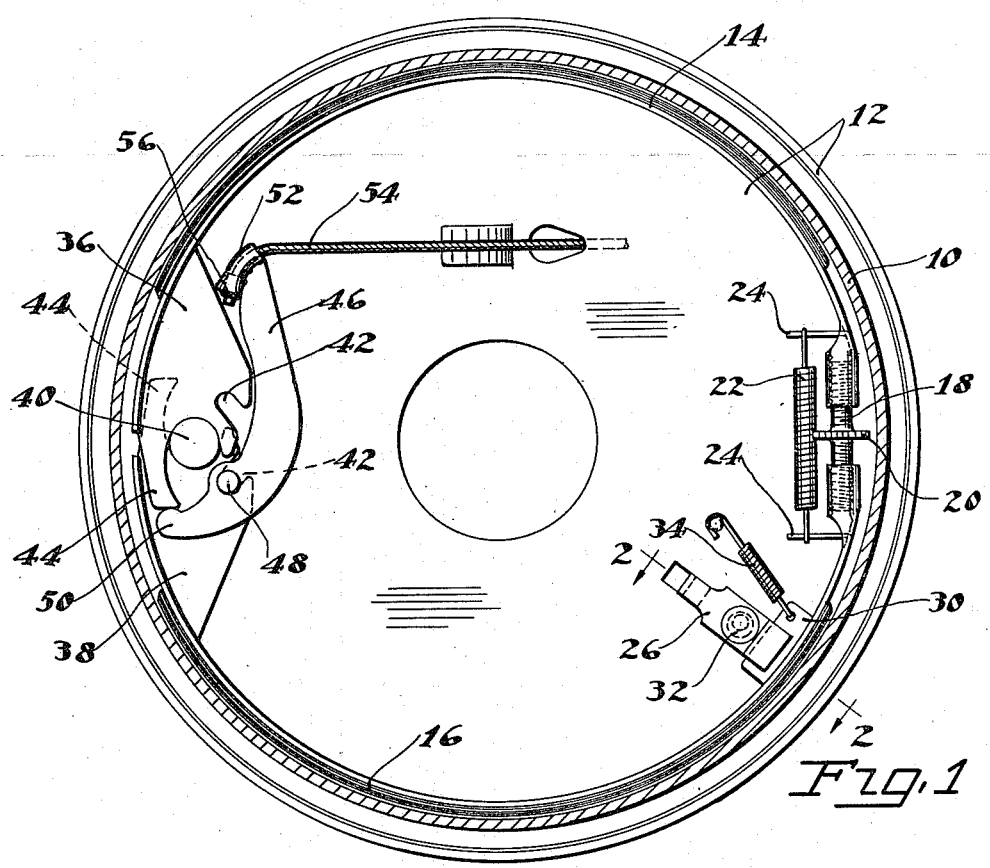
Figure 1 is a vertical section through the brake, just inside the head of the brake drum, showing the brake friction means in side elevation.
Figure 2:
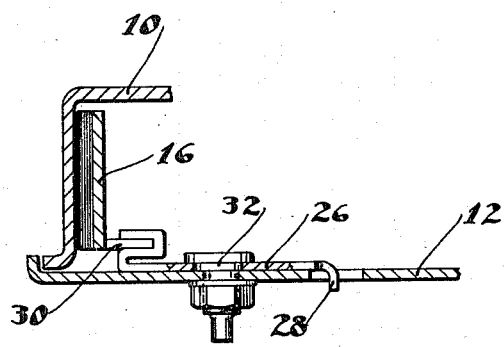
Figure 2 is a partial radial section on the line 2—2 of Figure 1, showing the novel steady rest.
Figure 3:
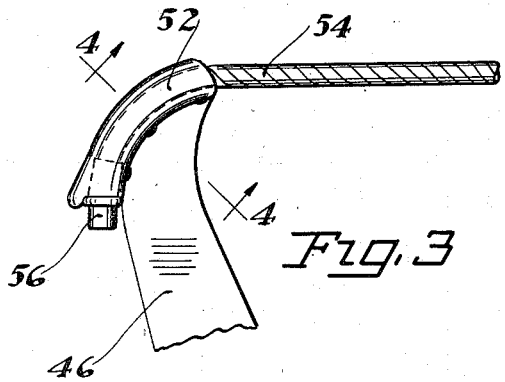
Figure 3 is an enlarged side elevation of the end of the simplified operating lever.
Figure 4:
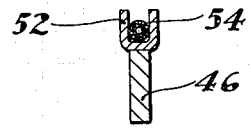
Figure 4 is a partial section through this lever, on the line 4—4 of Figure 3.

Suitable steady rests may be provided; however, I prefer the simple form shown in Figures 1 and 2. In this form, a stamping 26 resting against the backing plate has a tongue 28 projecting into a slot in the plate to keep it from turning, and formed at its outer end to embrace a web 30 secured to the band 16. Means such as an eccentric 32 is provided for adjusting the stamping 26 toward and from the drum, and a return spring 34 tensioned between web 30 and the backing plate urges the band toward the idle position determined by stamping 26.

Bands 14 and 16, or their equivalents, are preferably provided with end fittings 36 and 38, welded or otherwise secured thereto, and which are shown formed with notches embracing a fixed stop such as an anchor 40 carried by the backing plate, also with notches 42, and with overlapping projections 44 extending past the anchor 40. The brake is applied by means such as a novel floating lever 46 having a part such as a pin 48 seated in one notch 42, and having a rounded end 50 in thrust engagement with one projection 44. I prefer to make fittings 36 and 38 interchangeable by forming both of them with notches 42 and with projections 44.

The lever is shown as having a curved channel-section part 52 welded to its end and receiving a tension operating cable 54 having a fitting 56 swaged on its end and engaging one end of the channel 52.

While bands 14 and 16 may be formed in such a manner that they tend to contract away from the drum into engagement with stop 40, when released, a suitable return spring may be provided if desired.

Figure 6:
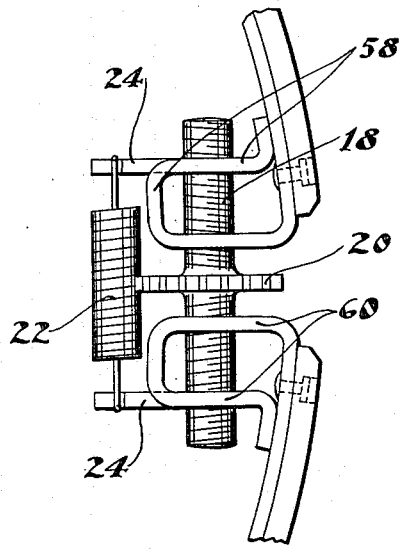
Figure 6 is a partial side elevation of a modified form of the wear adjustment.

In the arrangement of Figure 6, the ends of bands 114 and 116 (corresponding to bands 14 and 16) are folded inwardly to provide loops 58 and 60, in the sides of which are formed sockets consisting of alined threaded openings receiving the adjusting member 18.

While various illustrative constructions have been described in detail, it is not my intention to limit the scope of the invention to those particular constructions, or otherwise than by the terms of the appended claims.

I claim:

1. A brake friction device folded over at one end and having a threaded socket, formed in said folded-over end, in combination with an adjusting device threaded into said socket.

2. A brake friction device having its side portions at one end folded toward each other to form a socket, in combination with a thrust device adjustably mounted in said socket.

3. A brake friction device formed at its end with a looped-over inwardly-projecting portion, in combination with a thrust device adjustably threaded into alined openings in the sides of said loop portion.

4. A brake friction device formed with a loop portion, in combination with a thrust device adjustably threaded into alined openings in the sides of said loop portion.

5. Brake friction means comprising a pair of friction devices having their adjacent ends folded over and integrally formed with threaded sockets generally in alinement with each other, in combination with a right-and-left threaded adjusting device received in said sockets.

6. Brake friction means comprising a pair of friction devices having, at their adjacent ends, their side portions folded toward each other to form alined sockets, in combination with adjusting means received in said sockets.

7. Brake friction means comprising a pair of friction devices having, at their adjacent ends, their side portions folded toward each other to form alined sockets which are threaded internally, in combination with right-and-left threaded adjusting means received in said sockets.

8. Brake friction means comprising a pair of friction devices having, at their adjacent ends, their side portions folded toward each other to form alined sockets, in combination with adjusting means received in said sockets, and a tensioned spring connected between said devices and holding the adjusting means against unintended shifting.

9. Brake friction means comprising a pair of friction devices having inwardly-looped portions at their adjacent ends, in combination with an adjusting device threaded through openings in said looped portions.

ROBERT F. KOHR.